Dec. 22, 1925.                                          1,566,452
J. H. WAGENHORST
WHEEL WITH DEMOUNTABLE TIRE CARRYING RIM
Filed March 8, 1919          2 Sheets-Sheet 2

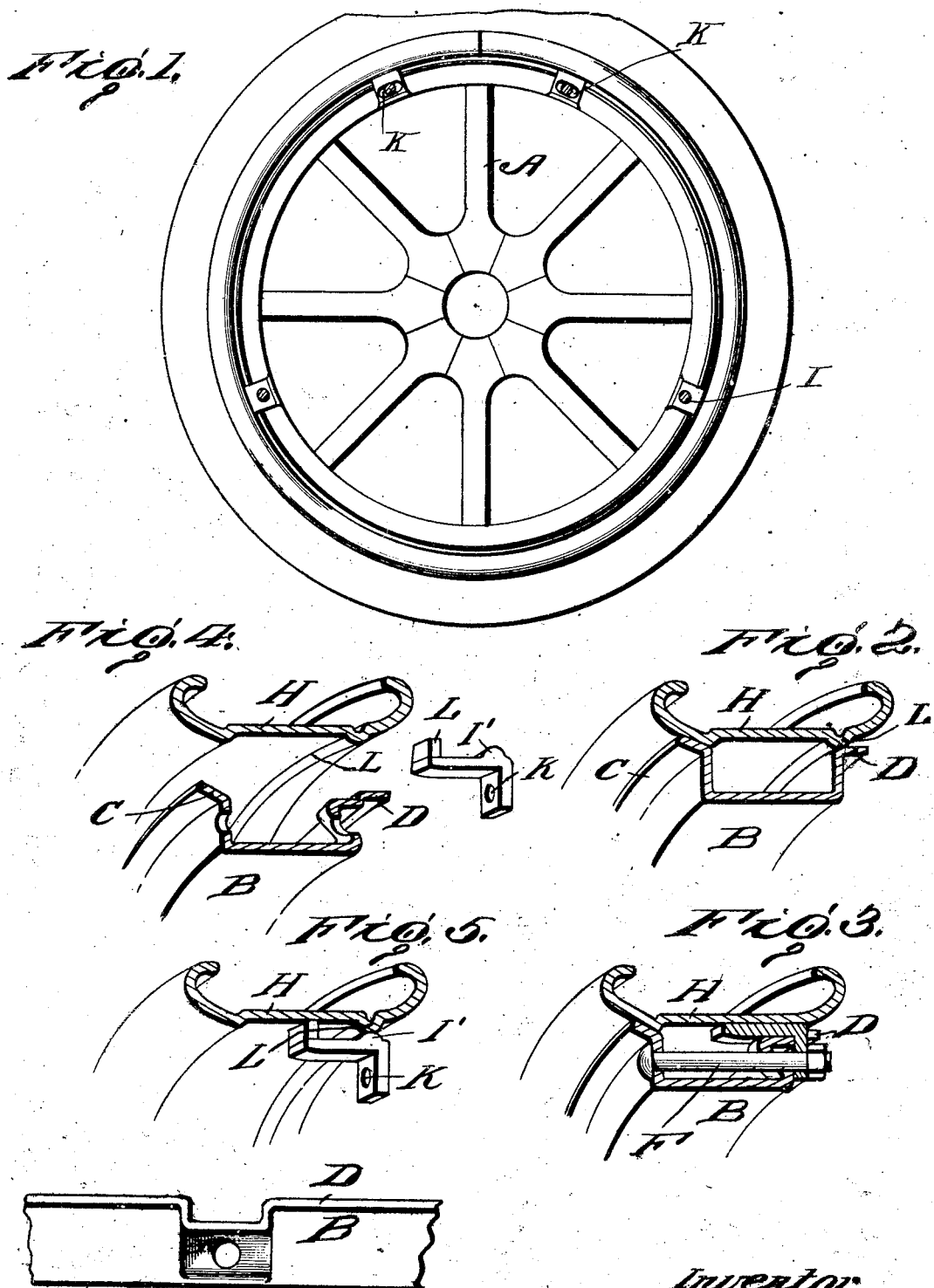

Inventor:
J. H. Wagenhorst.
By Hull, Smith, Brock & West,
Attys.

Patented Dec. 22, 1925.

1,566,452

UNITED STATES PATENT OFFICE.

JAMES H. WAGENHORST, OF AKRON, OHIO.

WHEEL WITH DEMOUNTABLE TIRE-CARRYING RIM.

Application filed March 8, 1919. Serial No. 281,489.

*To all whom it may concern:*

Be it known that I, JAMES H. WAGENHORST, a citizen of the United States, residing at Akron, in the county of Summit and State of Ohio, have invented a certain new and useful Improvement in Wheels with Demountable Tire-Carrying Rims, of which the following is full, clear, and exact description, reference being had to the accompanying drawings.

This invention relates to wheels and demountable tire carrying rims adapted for use in connection with said wheels.

The object of the invention is to provide a wheel body which shall be light, strong, and durable and which will lend itself for use in connection with demountable tire carrying rims.

Another object of the invention is to provide a demountable tire carrying rim which can be quickly and easily placed upon or removed from the wheel body. A still further object is to provide a rim in which the internal pressure of the tire carried thereon will assist in maintaining the rim upon the wheel body.

Another object of the invention is to provide a tire carrying rim in which a minimum number of parts will be required to positively secure the rim upon the wheel body. Another object of the invention is to provide a tire carrying rim embodying all of these characteristics and which can be adapted for use with either a straight side or clincher tire.

With these various objects in view and certain others which will become apparent as the description proceeds, the invention consists in the novel features of construction and in the manner of combining the same, all of which will be fully described hereinafter and set forth in the appended claims.

Figure 7:
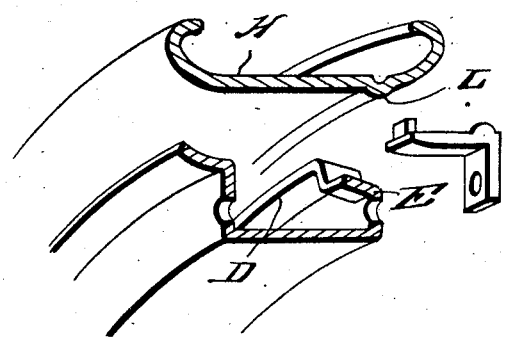
Figure 9:
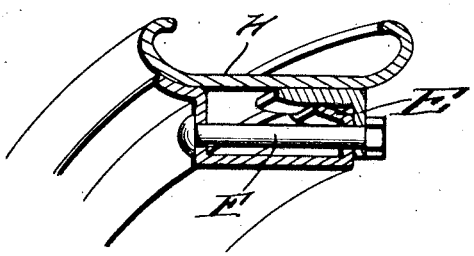
Figure 8:
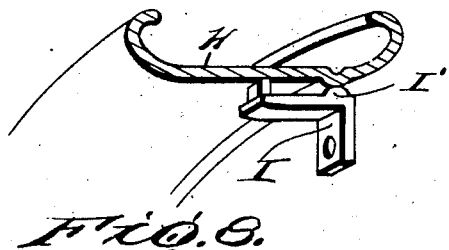
Figure 10:
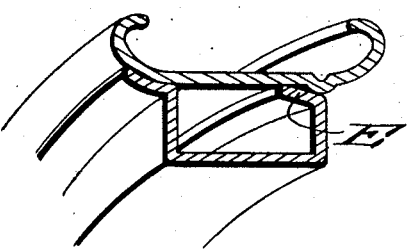
Figure 11:
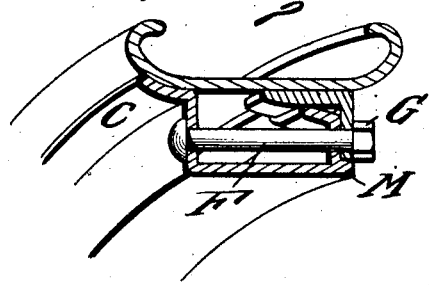
Figure 12:
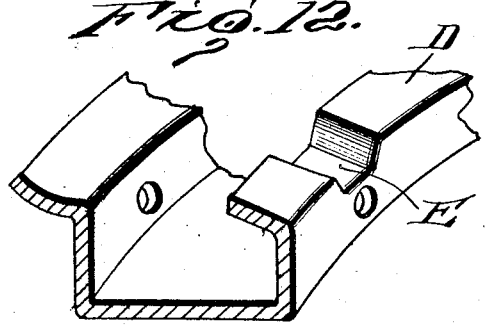
Figure 13:
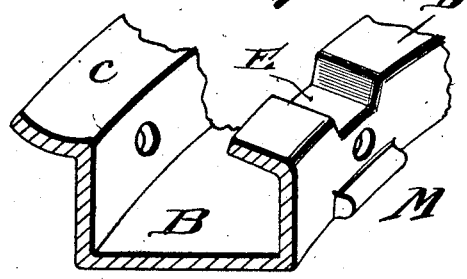

In the drawings forming a part of this specification, Fig. 1 is a face view of a wheel body and demountable tire carrying rim arranged thereon and embodying one form of my invention; Fig. 2 is a detail sectional view showing one form of rim in engagement with one form of fixed rim; Fig. 3 is a similar view showing the means for fastening the demountable tire carrying rim to the wheel body; Fig. 4 is a detail view showing a section of the tire carrying rim, the fixed rim and the clamping lug, these various parts being disconnected; Fig. 5 is a detail view showing the demountable tire carrying rim and clamping lug arranged preparatory to being welded to the tire carrying rim; Fig. 6 is a detail perspective view showing the portion of the fixed rim; Fig. 7 is a detail view similar to Fig. 4 and illustrating a slightly different form of fixed rim; Fig. 8 is a view similar to Fig. 5 showing a slight modification in the clamping lug; Figs. 9 and 10 are detail sectional views of the tire carrying rim arranged upon the type of fixed rim shown in Fig. 7; Fig. 11 is a sectional view showing a still further modification of the fixed rim and Figs. 12 and 13 are detail sectional structures of the forms shown in Figs. 7-11 inclusive.

In constructing a wheel body in accordance with my invention I employ a plurality of wooden spokes A and a sheet metal fixed rim B, this sheet metal fixed rim being connected to the spoke ends in any suitable manner. The fixed rim B is channeled, as shown, and the inner leg thereof is provided with an inwardly extending flange C, which is preferably curved slightly to conform to the curve of the tire carrying rim hereinafter referred to. The outer leg of the fixed rim is of less height than the inner leg and may be provided with a straight outwardly extending flange D, as shown in Figs. 2, 3, and 6, or it may be made with an inwardly extending and inclined flange E as shown in Figs. 7-13. Transverse bolts F are passed through the fixed rim at definite points, the outer ends of the bolts being threaded to receive the nuts G and the outer leg and flange are pressed inwardly at points in line with the transverse bolts for a purpose hereinafter explained.

H indicates the tire carrying rim which can be of the clincher type or straight side type. Rigidly connected to the tire carrying rim are the clamping lugs I, said lugs being butt welded to the rim and having an inwardly extending portion apertured as shown at K and through which the threaded ends of the bolts F pass, the nuts being then screwed on to securely fasten the demountable tire carrying rim to the fixed rim of the wheel body. The inner portion of the rim is preferably curved to correspond with the curved flange C of the fixed rim. The outer portion of the tire carrying rim is provided with an inwardly extending rib L which is adapted to rest upon the flange D or E and compensates for the difference in height of the legs of the fixed rim. This rib L may be in the form of an inrolled bead as shown in Figs. 2, 4, 7, and 10.

In the forms of rims illustrated in Figs. 2, 3, 9, and 10, the clamping lug is welded to the base of the rim. In all instances it is butt welded and to facilitate this operation the clamping lug is preferably formed with protruding portions I' and one of these protruding portions contacts with the inrolled bead or other form of inwardly projecting rib, and during the welding process these protuberances and the contiguous portions of the bead or rib become flattened out so as to intimately unite the clamp to the base of the rim.

In practice I prefer to employ four clamping lugs, one adjacent each end of the transplit tire carrying rim and the other two at equidistant points from said first mentioned lugs and about 60° therefrom. The openings or apertures K in the end lugs are slightly elongated circumferentially to permit a limited expansion of the rim when being fastened upon the wheel body, but the other two lugs may have the usual round holes to receive the bolt ends.

As previously stated the outer flange and leg are pressed inwardly, this being done to provide space or clearance for the reception of the clamping lugs, and in Figs. 11 and 13 the outer leg of the fixed rim is formed with an outwardly extending ledge or foot piece M against which the inner end of the clamping lug can be brought to bear.

In operation a pneumatic tire is placed upon the tire carrying rim and the tire carrying rim with tire thereon is then placed upon the fixed rim of the wheel body the differential heights of the legs of the fixed rim permitting the tire carrying rim to be freely placed upon the fixed rim and the bolt ends will pass through the apertures in the clamping lugs, and then by applying the nuts and tightening the same the rim will be brought into a true plane, the inner side of the rim contacting with the inner flange of the fixed rim while the inrolled bead or rib will contact with the outer flange, the rim being drawn inwardly at the points of fastening and it is obvious that when the nuts are properly tightened the rim will be securely fastened, holding the same in a true plane and at the same time providing the necessary driving connection between the wheel rim and tire. The internal tire pressure will prevent any considerable separation of the rim ends, but will permit a slight separation as the rim is fastened upon the wheel body; but the constant interior pressure of the tire will serve to maintain firm and positive contact of the rim against the wheel body. In other words, the tire pressure is constantly acting to contract the rim whereas the fastening means tends to exert force in the opposite direction. By these two forces acting against one another a firm contact and fastening is obtained with the aid of the minimum number of parts.

It will be understood that while I have shown and described certain preferred forms of construction of the various parts there can be various changes or modifications of said parts within the scope of the appended claims.

Having thus described my invention, what I claim is:—

1. The combination with a wheel body having a channeled sheet metal fixed rim provided with rim supporting flanges, of a one piece transplit tire carrying demountable rim, clamping lugs rigidly connected to said rim, transverse bolts passing through the fixed rim and through openings in the inner ends of said clamping lugs, nuts upon said bolts, the openings in the clamping lugs adjacent the split in the tire carrying rim being elongated.

2. The combination with a wheel body having a channeled sheet metal fixed rim having rim supporting flanges, of a one piece transplit tire carrying rim, spaced clamping lugs connected to said rim, transverse bolts passing through the fixed rim and through openings in the clamping lugs, nuts upon the ends of said bolts, two of said clamps being arranged adjacent the split in the rim and upon opposite sides of said split.

3. The combination with a wheel body having a channeled sheet metal fixed rim having rim supporting legs provided with oppositely disposed flanges, of a transplit demountable tire carrying rim having clamping lugs connected thereto, bolts passing through the fixed rim and through openings in the clamping lugs, at least two of said lugs being arranged upon opposite sides of the split in rim and adjacent thereto, the opening in said lugs being non-circular, and nuts upon the ends of the bolts.

In testimony whereof, I hereunto affix my signature.

JAMES H. WAGENHORST.